US012003954B2

(12) United States Patent
Subramanian et al.

(10) Patent No.: US 12,003,954 B2
(45) Date of Patent: Jun. 4, 2024

(54) AUDIO SYSTEM AND METHOD OF DETERMINING AUDIO FILTER BASED ON DEVICE POSITION

(71) Applicant: Apple Inc., Cupertino, CA (US)

(72) Inventors: Vignesh Ganapathi Subramanian, Sunnyvale, CA (US); Antti J. Vanne, Kuopio (FI); Olivier Soares, Oakland, CA (US); Andrew R. Harvey, San Jose, CA (US); Martin E. Johnson, Los Gatos, CA (US); Theo Auclair, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 59 days.

(21) Appl. No.: 17/706,504

(22) Filed: Mar. 28, 2022

(65) Prior Publication Data

US 2022/0322024 A1 Oct. 6, 2022

Related U.S. Application Data

(60) Provisional application No. 63/169,004, filed on Mar. 31, 2021.

(51) Int. Cl.

*H04R 5/02* (2006.01)
*H04R 5/033* (2006.01)
*H04R 5/04* (2006.01)
*H04S 7/00* (2006.01)

(52) U.S. Cl.

CPC ............. *H04S 7/304* (2013.01); *H04R 5/033* (2013.01); *H04R 5/04* (2013.01); *H04S 2400/15* (2013.01); *H04S 2420/01* (2013.01)

(58) Field of Classification Search

CPC .. H04S 7/304; H04S 2400/15; H04S 2420/01; H04R 5/033; H04R 5/04
USPC .................................................. 381/309, 310
See application file for complete search history.

(56) References Cited

U.S. PATENT DOCUMENTS 9,544,706 B1 1/2017 Hirst et al.
9,918,178 B2 3/2018 Norris et al.
10,097,914 B2 10/2018 Petrank
10,585,472 B2 3/2020 Tokubo et al.
(Continued)

FOREIGN PATENT DOCUMENTS

EP 1787494 B1 1/2014
EP 3544321 A1 9/2019
(Continued)

*Primary Examiner* — Ammar T Hamid
(74) *Attorney, Agent, or Firm* — Aikin & Gallant, LLP

(57) ABSTRACT

An audio system and a method of determining an audio filter based on a position of an audio device of the audio system, are described. The audio system receives an image of the audio device being worn by a user and determines, based on the image and a known geometric relationship between a datum on the audio device and an electroacoustic transducer of the audio device, a relative position between the electroacoustic transducer and an anatomical feature of the user. The audio filter is determined based on the relative position. The audio filter can be applied to an audio input signal to render spatialized sound to the user through the electroacoustic transducer, or the audio filter can be applied to a microphone input signal to capture speech of the user by the electroacoustic transducer. Other aspects are also described and claimed.

20 Claims, 9 Drawing Sheets

(56) References Cited

U.S. PATENT DOCUMENTS

| | | | |
|---|---|---|---|
| 10,595,143 | B2 | 3/2020 | Norris et al. |
| 11,234,095 | B1 * | 1/2022 | Cho ........................ H04S 7/304 |
| 2010/0166206 | A1 | 7/2010 | Macours |
| 2012/0183161 | A1 | 7/2012 | Agevik et al. |
| 2012/0328107 | A1 | 12/2012 | Nyström et al. |
| 2013/0169779 | A1 | 7/2013 | Pedersen |
| 2017/0045941 | A1 | 2/2017 | Tokubo et al. |
| 2017/0156017 | A1 | 6/2017 | Gamper et al. |
| 2018/0027349 | A1 | 1/2018 | Osman |
| 2019/0304081 | A1 | 10/2019 | Vanne et al. |

FOREIGN PATENT DOCUMENTS

| | | | |
|---|---|---|---|
| KR | 20170082124 | A | 7/2017 |
| KR | 20210016543 | A | 2/2021 |

* cited by examiner

AUDIO SYSTEM AND METHOD OF DETERMINING AUDIO FILTER BASED ON DEVICE POSITION

This application claims the benefit of priority of U.S. Provisional Patent Application No. 63/169,004, filed Mar. 31, 2021, which is incorporated herein by reference in its entirety.

BACKGROUND

Field

Aspects related to devices having audio capabilities are disclosed. More particularly, aspects related to devices used to render spatial audio are disclosed.

Background Information

Spatial audio can be rendered using audio devices that are worn by a user. For example, headphones can reproduce a spatial audio signal that simulates a soundscape around the user. An effective spatial sound reproduction can render sounds such that the user perceives the sound as coming from a location within the soundscape external to the user's head, just as the user would experience the sound if encountered in the real world.

When a sound travels to a listener from a surrounding environment in the real world, the sound propagates along a direct path, e.g., through air to the listeners ear canal entrance, and along one or more indirect paths, e.g., by reflecting and diffracting around the listeners head or shoulders. As the sound travels along the indirect paths, artifacts can be introduced into the acoustic signal that the ear canal entrance receives. These artifacts are anatomy dependent, and accordingly, are user-specific. The user therefore perceives the artifacts as natural.

User-specific artifacts can be incorporated into binaural audio by signal processing algorithms that use spatial audio filters. For example, a head-related transfer function (HRTF) is a filter that contains all of the acoustic information required to describe how sound reflects or diffracts around a listener's head before entering their auditory system at an ear canal entrance of the listener. An HRTF can be measured for a particular user in a laboratory. The HRTF can be applied to an audio input signal to shape the signal in such a way that reproductions of the shaped signal realistically simulates a sound traveling to the user from a surrounding environment. Accordingly, a listener can use simple stereo headphones to create the illusion of a sound source somewhere in a listening environment by applying the HRTF to the audio input signal.

SUMMARY

Existing methods of generating and applying head-related transfer functions (HRTFs) assume that the headphones emit the spatialized sound directly into the ear canal entrance of the listener. This assumption may be erroneous, however. For example, when the listener is wearing an audio device that has speakers distanced from the ear canal entrance, e.g., as in the case of extra-aural headphones, the spatialized sound may experience additional artifacts before entering the ear canal entrance. The user may therefore perceive the spatialized sound as being an imperfect representation of sound as it would usually be experienced.

An audio system and a method of using the audio system to determine an audio filter that compensates for relative positioning between an electroacoustic transducer, e.g., a speaker, and an anatomical feature, e.g., an ear canal entrance, are described. By compensating for the relative position, spatialized sound output to a user can accurately represent sound as it would normally be experienced by the user. In an aspect, a method includes receiving an image of an audio device being worn on a head of a user. A monitoring device, e.g., a wearable device, can output one or more of a visual cue, an audio cue, or a haptic cue to guide the user to move a remote device relative to the audio device for image capture. Accordingly, a camera of the remote device can capture the image, which includes a datum of the audio device and an anatomical feature of the user.

In an aspect, one or more processors of the audio system determine a relative position between the anatomical feature and an electroacoustic transducer of the audio device. The determination can be made based on the image and also based on a known geometric relationship between the datum and the electroacoustic transducer. For example, the electroacoustic transducer may not be visible in the image, however, the geometric relationship between the datum, which is visible in the image, and the hidden electroacoustic transducer may be used to determine a location of the electroacoustic transducer. The relative position between the hidden electroacoustic transducer, e.g., a speaker or a microphone of the audio device, and the visible anatomical feature, e.g., an ear canal entrance or a mouth of the user, can then be determined.

In an aspect, an audio filter may be determined based on the relative position. The audio filter can compensate for the relative position between the electroacoustic transducer and the anatomical feature. For example, artifacts can be introduced by a separation between the ear canal entrance of the user and an extra-aural speaker of a wearable device. The audio filter can compensate for those artifacts, and thus, can be selected based on the determined separation. The audio filter can therefore be applied to an audio input signal to generate a spatial input signal, and the extra-aural speaker can be driven with the spatial input signal to render a realistic spatialized sound to the user.

In an aspect, a device includes a memory and one or more processors configured to perform the method described above. For example, the memory can store the image of the audio device, and instructions executable by the processor(s) to cause the device to perform the method, including determining the relative positon based on the image, and determining the audio filter based on the relative position.

The above summary does not include an exhaustive list of all aspects of the present invention. It is contemplated that the invention includes all systems and methods that can be practiced from all suitable combinations of the various aspects summarized above, as well as those disclosed in the Detailed Description below and particularly pointed out in the claims filed with the application. Such combinations have particular advantages not specifically recited in the above summary.

DETAILED DESCRIPTION

Figure 1:
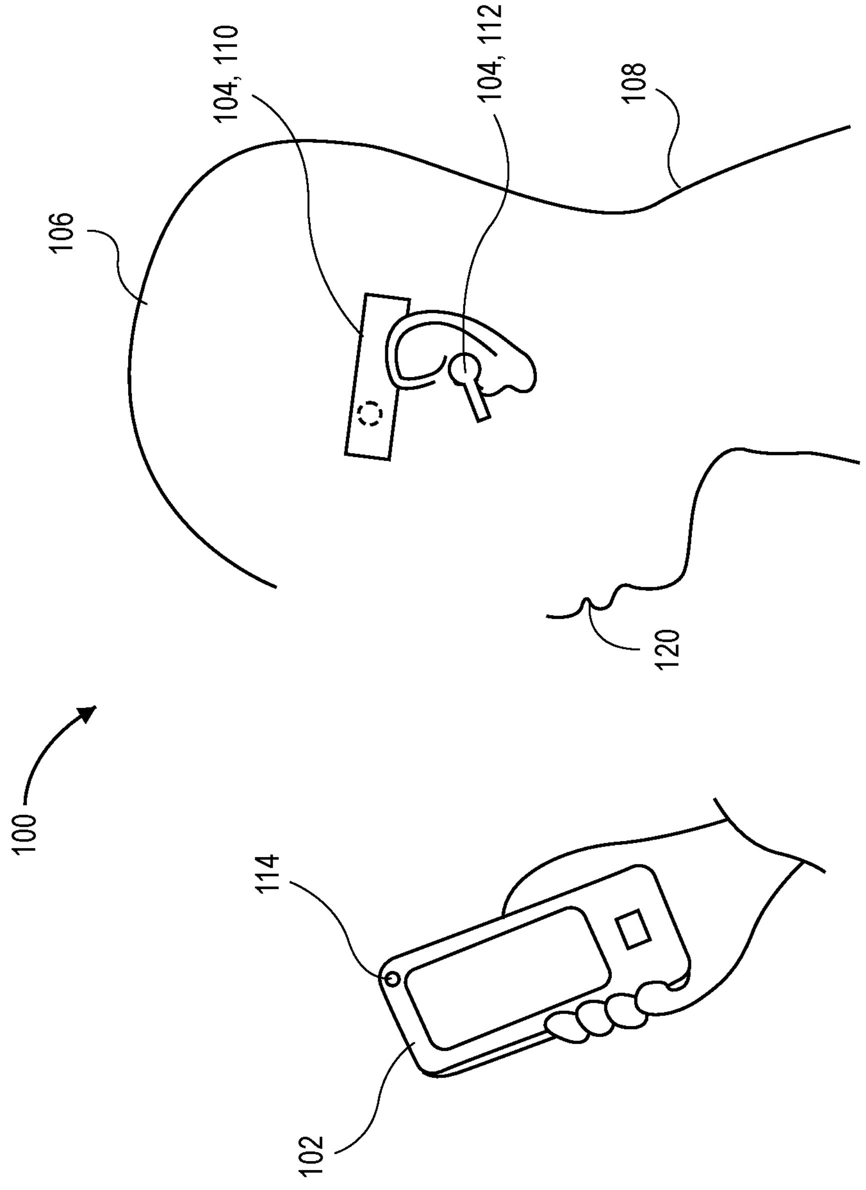
FIG. 1 is a pictorial view of a user wearing an audio device and holding a remote device, in accordance with an aspect.

Aspects describe an audio system and a method of determining an audio filter based on a position of an audio device relative to an anatomical feature of a listener, and using the audio filter to effect audio playback or audio pickup of the audio system. The audio system can include the audio device, and can apply the audio filter to an audio input signal to generate a spatial input signal for playback by the audio device. For example, the audio device can be a wearable device, such as extra-aural headphones, a head-mounted device having extra-aural headphones, etc. The audio device may be another wearable device, however, such as earphones or a telephony headset, to name only a few possible applications.

In various aspects, description is made with reference to the figures. However, certain aspects may be practiced without one or more of these specific details, or in combination with other known methods and configurations. In the following description, numerous specific details are set forth, such as specific configurations, dimensions, and processes, in order to provide a thorough understanding of the aspects. In other instances, well-known processes and manufacturing techniques have not been described in particular detail in order to not unnecessarily obscure the description. Reference throughout this specification to "one aspect," "an aspect," or the like, means that a particular feature, structure, configuration, or characteristic described is included in at least one aspect. Thus, the appearance of the phrase "one aspect," "an aspect," or the like, in various places throughout this specification are not necessarily referring to the same aspect. Furthermore, the particular features, structures, configurations, or characteristics may be combined in any suitable manner in one or more aspects.

The use of relative terms throughout the description may denote a relative position or direction. For example, "in front of" may indicate a first direction away from a reference point. Similarly, "behind" may indicate a location in a second direction away from the reference point and opposite to the first direction. Such terms are provided to establish relative frames of reference, however, and are not intended to limit the use or orientation of an audio system or system component, e.g., an audio device, to a specific configuration described in the various aspects below.

In an aspect, an audio system includes an audio device that is worn by a user, and a remote device that can image the audio device while it is being worn. Based on an image captured by the remote device, a relative position between an electroacoustic transducer of the audio device, e.g., a speaker or a microphone, and an anatomical feature of the user, e.g., an ear canal entrance or a mouth, can be determined. The electroacoustic transducer may not be visible in the image, and thus, a known geometric relationship between the electroacoustic transducer and a visible datum of the audio device may be used to make the determination. An audio filter can be determined based on the relative position. The audio filter can compensate for a spatial offset between the anatomical feature and the electroacoustic transducer, and thus, can generate spatialized audio that is more realistic to the user or can generate a microphone pickup signal that more accurately captures an external sound, such as a voice of the user.

Referring to FIG. 1, a pictorial view of a user wearing an audio device and holding a remote device is shown in accordance with an aspect. An audio system 100 can include a device, e.g., a remote device 102, such as a smartphone, a laptop, a portable speaker, etc., in communication with an audio device 104 being worn on a head 106 of a user 108. As shown, the user 108 may wear several audio devices 104. For example, the audio device 104 could be a wearable device such as extra-aural headphones 110, a head-mounted display used for applications such as virtual reality or augmented reality video or games, or another device having a speaker and/or microphone spaced apart from an ear or mouth of a user. More particularly, the wearable device 110 can include extra-aural speakers, a microphone, and optionally a display, as described below. Alternatively, the audio device 104 could be earphones 112. The earphones 112 may include a speaker that emits sound directly into an ear of the user 108. Accordingly, the user 108 can listen to audio, such as music, movie, or game content, binaural audio reproductions, phone calls, etc., played by the audio device 104. In an aspect, the remote device 102 can drive the audio device 104 to render spatial audio to the user 108.

In an aspect, the audio device 104 can include a microphone. The microphone can be built into the wearable device 110 or the earphones 112 to detect sound internal to and/or external to the audio device 104. For example, the microphone can be mounted on the audio device 104 at a location to face a surrounding environment. Accordingly, the microphone can detect input signals corresponding to sounds received from the surrounding environment. For example, the microphone can point toward a mouth 120 of the user 108 to pick up a voice of the user 108 and generate corresponding microphone output signals.

In an aspect, the remote device 102 includes a camera 114 to capture an image of the audio device 104 worn on the head 106 of the user 108 while the remote device 102 is moved around the head 106. For example, the remote device 102 can capture, e.g., via the camera 114, several images while the remote device 102 moves continuously around the head 106. The image(s) can be used to determine an audio filter to effect an output of the speaker or the microphone of the audio device 104, as described below. Moreover, the remote device 102 can include circuitry to connect with the audio device 104 wirelessly or by a wired connection to communicate signals used for audio rendering, e.g., binaural audio reproduction.

Figure 2:
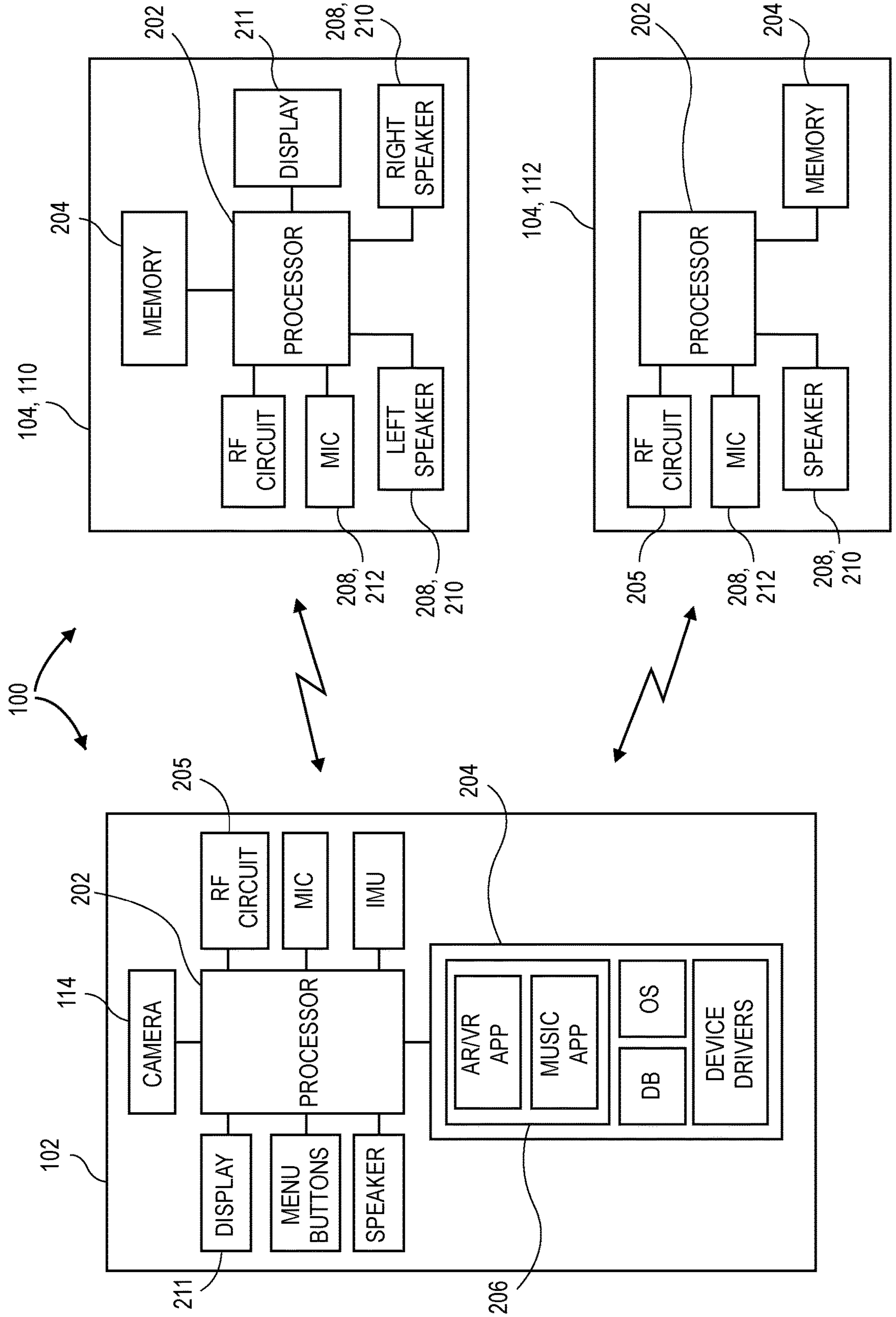
FIG. 2 is a block diagram of an audio system, in accordance with an aspect.

Referring to FIG. 2, a block diagram of an audio system is shown in accordance with an aspect. The audio system 100 can include the remote device 102, which can be any of several types of portable devices or apparatuses with circuitry suited to specific functionality. Similarly, the audio system 100 can include a first audio device 104, e.g., the wearable device 110, and/or a second audio device 104, e.g., the earphone 112. More particularly, the audio device 104 can include any of several types of wearable devices or apparatuses with circuitry suited to specific functionality. The wearable devices can be head worn, wrist worn, or worn on any other part of a body of the user 108. The diagrammed circuitry is provided by way of example and not limitation.

The audio system 100 may include one or more processors 202 to execute instructions to carry out the different functions and capabilities described below. Instructions executed by the processor(s) 202 may be retrieved from a memory 204, which may include a non-transitory machine readable medium. The instructions may be in the form of an operating system program having device drivers and/or an audio rendering engine for rendering music playback, binaural audio playback, etc., according to the methods described below. The processor(s) 202 can retrieve data from the memory 204 for various uses, including: for image processing; for audio filter selection, generation, or application; or for any other operations including those involved in the methods described below.

The one or more processors 202 may be distributed throughout the audio system 100. For example, the processor(s) 202 may be incorporated in the remote device 102 or the audio device 104. The processor(s) 202 of the audio system 100 may be in communication with each other. For example, the processor 202 of the remote device 102 and the processor 202 of the audio device 104 may communicate signals with each other wirelessly via respective RF circuitry 205, as shown by the arrows, or through a wired connection. The processor(s) 202 of the audio system 100 can also be in communication with one or more device components within the audio system 100. For example, the processor 202 of the audio device 104 can be in communication with an electroacoustic transducer 208, e.g., a speaker 210 or a microphone 212, of the audio device 104.

In an aspect, the processor(s) 202 can access and retrieve audio data stored in the memory 204. Audio data may be an audio input signal provided by one or more audio sources 206. The audio source(s) can include phone and/or music playback functions controlled by telephony or audio application programs that run on top of the operating system. Similarly, the audio source(s) can include an augmented reality (AR) or virtual reality (VR) application program that runs on top of the operating system. In an aspect, an AR application program can generate a spatial input signal to be output to an electroacoustic transducer 208, e.g., a speaker 210, of the audio device 104. For example, the remote device 102 and the audio device 104, e.g., the wearable device 110 or the earphone 112, can communicate signals wirelessly. Accordingly, audio device 104 can render spatial audio to the user 108 based on the spatial input signal from audio source(s).

In an aspect, the memory 204 stores audio filter data for use by the processor(s) 202. For example, the memory 204 can store audio filters that can be applied to audio input signals from the audio source(s) to generate the spatial input signal. Audio filters as used herein can be implemented in digital signal processing code or computer software as digital filters that perform equalization or filtering of an audio input signal. For example, the dataset can include measured or estimated HRTFs that correspond to the user 108. A single HRTF of the dataset can be a pair of acoustic filters (one for each ear) that characterize the acoustic transmission from a particular location in a reflection-free environment to an ear canal entrance of the user 108. Personalized equalization can also be done individually for each ear. The ears and their locations relative to the head are asymmetric and the audio device 104 may be worn so that relative position is different between ears. Therefore, the acoustic filters selected for the ears can be individualized to the ears, rather than being selected as a fixed pair. The dataset of HRTFs encapsulate the fundamentals of spatial hearing of the user 108. The dataset can also include audio filters that compensate for a separation between the ear canal entrance of the user 108 and the speaker 210 of the audio device 104. Such audio filters can be applied directly to the audio input signal, or to the audio input signal filtered by an HRTF-related audio filter, as described below. Accordingly, the processor(s) 202 can select one or more audio filters from a database in the memory 204 to apply to an audio input signal to generate a spatial input signal. Audio filters in the memory 204 may also be used to affect a microphone input signal of the microphone 212, as described below.

The memory 204 can also store data generated by an imaging system of the remote device 102. For example, a structured light scanner or RGB camera 114 of the remote device 102 can capture an image of the audio device 104 being worn on the head 106 of the user 108, and the image can be stored in the memory 204. Images may be accessed and processed by the processor 202 to determine relative positions between anatomical features of the user 108 and the electroacoustic transducer(s) of the audio device 104.

To perform the various functions, the processor(s) 202 may directly or indirectly implement control loops and receive input signals from, and/or provide output signals to, other electronic components. For example, the processor(s) 202 may receive input signals from microphone(s) or input controls, such as menu buttons of the remote device 102. Input controls may be displayed as user interface elements on displays of the remote device 102 or the audio device 104, and may be selected by input selections of user interface elements displayed on a display 211, e.g., when the wearable device 110 is a head-mounted display.

Figure 3:
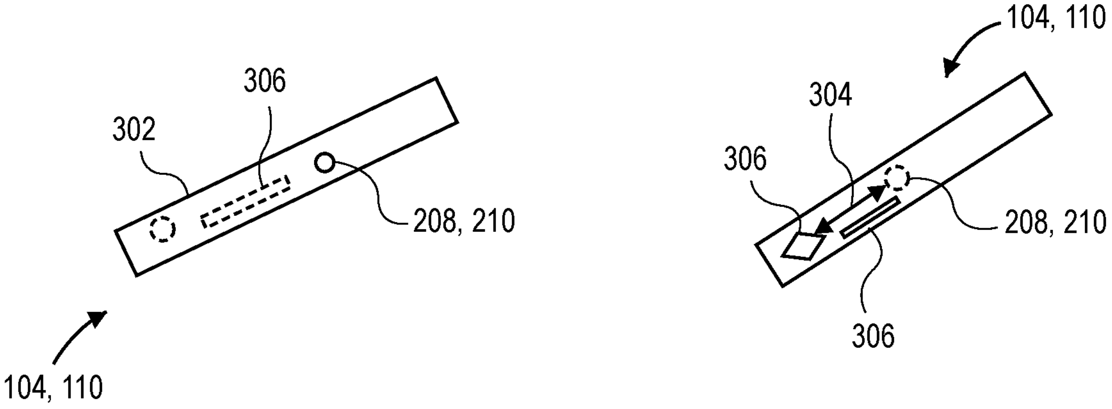
FIG. 3 is a perspective view of an audio device, in accordance with an aspect.

Referring to FIG. 3, a perspective view of an audio device is shown in accordance with an aspect. The audio device 104 can be the wearable device 110, and may have features germane to and typically associated with that type of device. For example, when the wearable device 110 is a head-mounted display, the device can have a housing that incorporates the display 211 for the user to view video content while wearing the audio device 104. The portion of the housing that holds the display 211 can rest on a nose of the user 108, and the audio device 104 may include other features to support the housing on the head 106 of the user 108. For example, the head-mounted display can include temples or a headband to support the housing on the head 106 of the user 108. Similarly, when the wearable device 110 includes extra-aural headphones, as shown in FIG. 3, the headphones can include temples 302 to support the device on the head 106 of the user 108.

The wearable device 110 can include electroacoustic transducers 208 to output sound or receive sound from the user 108. For example, the electroacoustic transducer 208 can include the speaker 210, which may be an extra-aural speaker integrated in the temple 302 of the wearable device 110. The wearable device 110 can include other features, such as an embossment or a hinge of the temple 302, a marking on the temple 302, a headband, a housing, etc.

The overall geometry of the wearable device 110 can be designed and modeled using computer-aided design. More particularly, the audio device 104 can be represented by a computer-aided design (CAD) model, which may be a virtual representation of the physical object of the audio device 104. Accordingly, the view of FIG. 3 may be a view of the CAD model. The CAD model can have the same properties as the physical object, and thus, geometric relationships between features of the audio device 104 can be represented by the CAD model.

In an aspect, several features of the audio device 104 can be related by a geometric relationship 304. The geometric relationship 304 can be distinct from a relative position in that the geometric relationship is known or determined with respect to a predetermined model of the audio device 104, as opposed to the actual relative position between the audio device components as they may exist in free space. The audio device 104 has a predetermined geometry, which is known based on the CAD model, and thus any two physical features of the device can have relative orientations or locations that can be determined based on the CAD model. By way of example, the audio device 104 can include a datum 306. The datum 306 can be any feature of the audio device 104 that is identifiable and/or can be imaged, and which can be used as a basis for determining a location of another feature of the audio device 104. For example, the datum 306 can be a marking on the temple 302, an embossment, cap, or hinge of the temple 302, or any other feature that can be imaged. The marking could be a diamond, a rectangle, or any other shape that is identifiable by image processing techniques.

As shown, the datum 306, in this case an embossment of the temple, can have the geometric relationship 304 with the electroacoustic transducer 208. More particularly, a point on the datum 306 can be spaced apart from the electroacoustic transducer 208, and the relative location between the features can be the geometric relationship 304. The geometric relationship of the features can be modeled in the CAD model. The geometric relationship 304 can be a difference in coordinates of the features within a Cartesian coordinate system, or any other system of representing the features in the CAD model.

Figure 4:
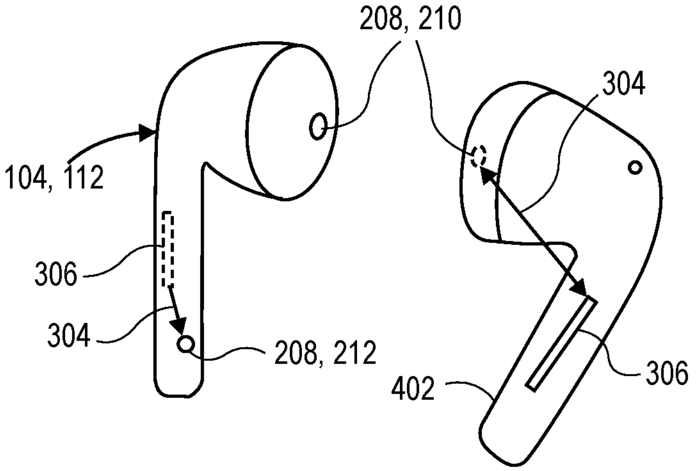
FIG. 4 is a perspective view of an audio device, in accordance with an aspect.

Referring to FIG. 4, a perspective view of an audio device is shown in accordance with an aspect. The audio device 104 can be the earphone 112, and may have features germane to and typically associated with that type of device. For example, the earphone 112 can have a housing that incorporates the speaker 210 and the microphone 212. The earphone 112 can be fit into the outer ear of the user 108 such that the speaker 210 can output sound into the ear canal entrance of the user 108. Similarly, the earphone 112 can have the microphone 212 spaced apart from the speaker 210, e.g., at a distal end of a body 402, to receive sound when the user 108 speaks.

Like the wearable device 110, the earphone 112 can have one or more datums 306 that are represented by the CAD model and identifiable in an image of the audio device 104. Like the wearable device 110, the earphone 112 can be designed and modeled using CAD, and the features of the earphone 112 can be related to each other through the resulting CAD model. For example, a geometric relationship 304 between a rectangular marking on the body 402 and the speaker 210 can be known and used to determine a spatial location of the speaker 210 when only the datum 306 is visible. Similarly, a geometric relationship 304 between a rectangular marking on the body 402 and the microphone 212 can be known and used to determine a spatial location of the microphone 212 when only the datum 306 visible. The datum 306 can be any identifiable physical feature, such as a bump, a groove, a color change, or any other feature of the audio device 104 that can be imaged.

The geometric relationship 304 between the datum 306 and the electroacoustic transducer 208, e.g., the speaker 210 or the microphone 212, can allow for the position of one feature to be determined based on a known location of the other feature. Even if only one feature, e.g., the datum 306, can be identified in an image, the location of the other feature, e.g., the speaker 210 hidden behind the temple 302 in FIG. 3, can be determined from the predetermined geometry of the audio device 104 that is known based on the CAD model. More particularly, based on the CAD model, the visible portions of the audio device 104 can be related to the hidden portions of the audio device 104.

Figure 5:
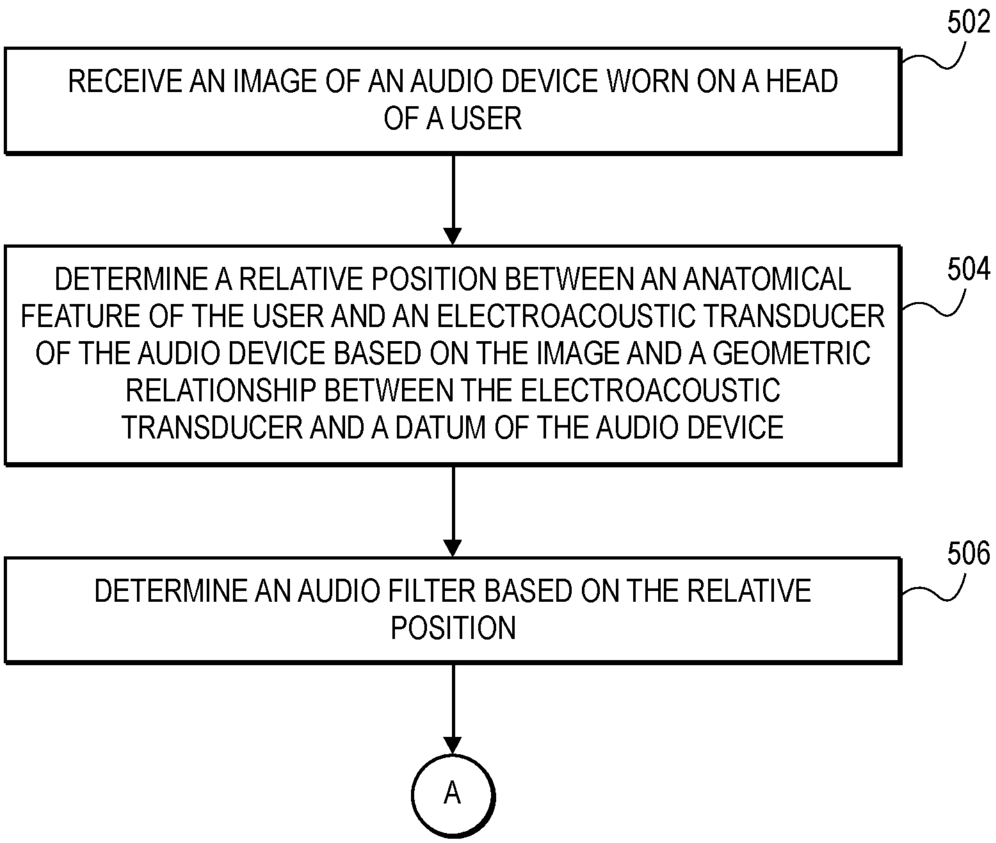
FIG. 5 is a flowchart of a method of determining an audio filter, in accordance with an aspect.

Referring to FIG. 5, a flowchart of a method of determining an audio filter is shown in accordance with an aspect. The method may be used to determine the audio filter based on a relationship between the electroacoustic transducer 208 (e.g., the speaker 210 or the microphone 212) of the audio device 104 and an anatomical feature (e.g., an ear canal entrance or the mouth 120) of the user 108. More particularly, the audio filter can be determined that compensates for artifacts introduced as a result of a separation between the anatomical feature and the electroacoustic transducer 208. For example, applying the audio filter to an audio input signal can provide acoustic compensation for the manner in which the user 108 is wearing the audio device 104. Operations of the method are illustrated in FIGS. 6-7, and thus, the operations of the method will be described together with those figures below.

Figure 6:
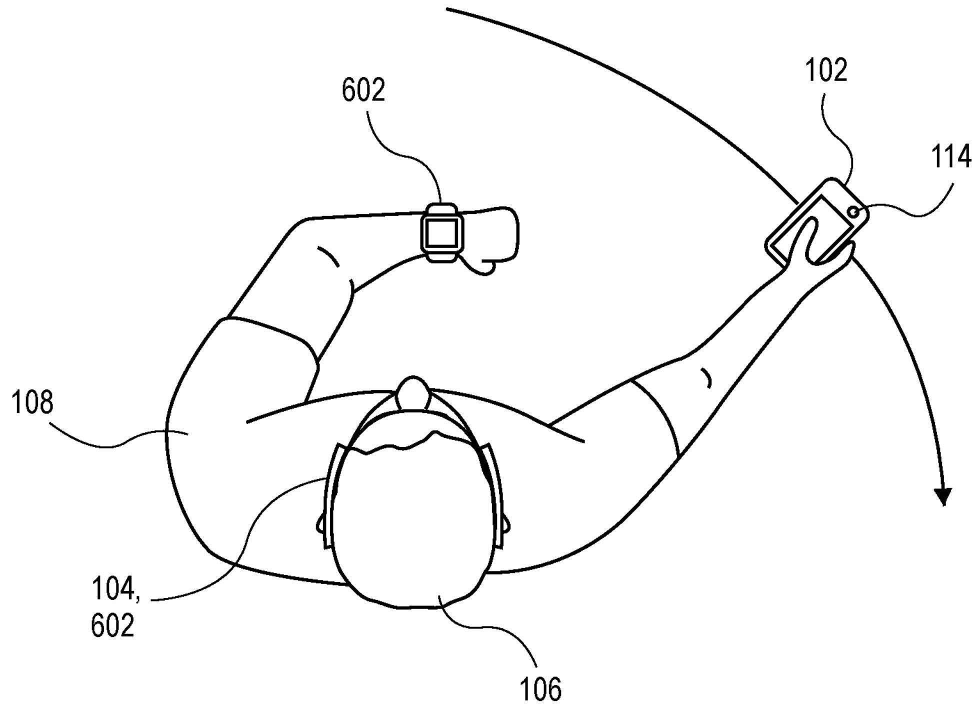
FIG. 6 is a pictorial view of a user capturing an image of an audio device worn on a head of the user, in accordance with an aspect.
Figure 7:
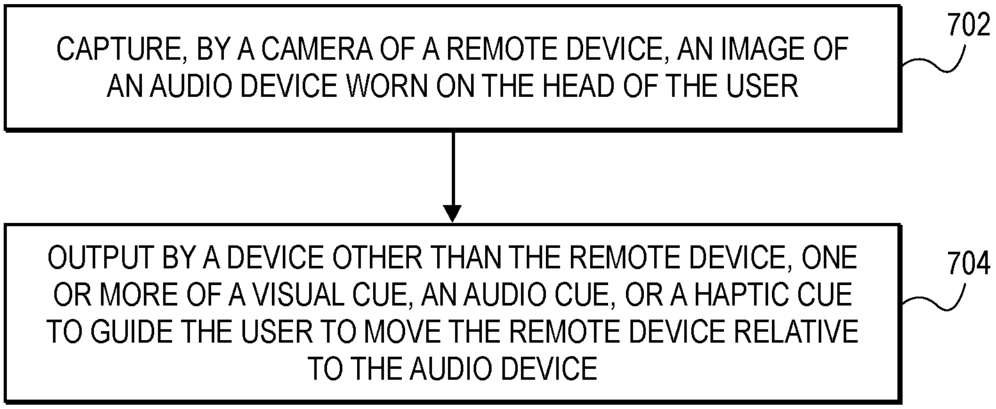
FIG. 7 is a flowchart of a method of guiding a user to capture an image of an audio device worn on a head of the user, in accordance with an aspect.

Referring to FIG. 6, a pictorial view of a user capturing an image of an audio device worn on a head of the user is shown in accordance with an aspect. At operation 502, an image of the audio device 104 can be received by the one or more processors 202 of the audio system 100. The image can be received from the camera 114 of the remote device 102. More particularly, during an enrollment process, the user 108 can move the remote device 102 in an arc path around the head 106 of the user 108 with the front-facing camera 114 of the remote device 102 facing the head 106 of the user 108. As the remote device 102 is swept around the head 106, the front-facing camera 114 can capture and record one or more images of a known device, e.g., the audio device 104, being worn on the head 106 of the user 108. For example, when the user 108 has donned the wearable device 110 or the earphone 112, the remote device 102 can record the audio device 104 and anatomical features of the head 106, such as the mouth 120 or an ear of the user 108. The one or more images may be several images. More particularly, the input data can be several images instead of only one image.

The image from the enrollment process can be used to determine an appropriate HRTF for the user 108. More particularly, methods provide for mapping the anatomy of the user 108 to a particular HRTF that is stored, e.g., in the database of the remote device 102, and selected for application to an audio input signal. The method of determining the HRTF will not be described at length, but it will be appreciated that the image capture used to map the anatomy of the user 108 to the particular HRTF can also be used to determine the audio filter that compensates for separation between the electroacoustic transducer 208 and the anatomical feature. Alternatively, the anatomy of the user 108 can be scanned a first time to determine the full anatomy of the user 108, e.g., while the user 108 is not wearing the audio device 104, and a second time to determine the relative positioning of the anatomy and the electroacoustic transducer 208, e.g., while the user 108 is wearing the audio device 104.

A goal of the enrollment process is to capture the image that shows a relative position between the audio device 104 and the anatomy of the user 108. The relative position can be a relative positioning between the audio device 104 (or a portion thereof) and the anatomy in the environment in which the image is captured, e.g., in free space where the user is located. For example, the image can show how the earphone 112 fits within the ear, a direction that the body 402 of the earphone 112 extends away from the ear or toward the mouth 120, how the wearable device 110 sits on the ear or the face of the user 108, how a headband of the wearable device 110 is positioned around the head 106 of the user 108, etc. This information about fit and, more particularly, relative position between the audio device 104 and the user anatomy can be used to determine information such as whether the user 108 has long hair that can affect an HRTF of the user 108, which direction sound will be received at the microphone 212 when the user 108 is speaking, which direction and how far sound must travel from the speaker 210 to the ear canal entrance, etc. More particularly, when the captured image(s) show a relative position between the electroacoustic transducer 208 and the user anatomy or, as described below, the relative position between the user anatomy and the datum 306 (which can be related to the electroacoustic transducer 208) then the audio signals can be properly adjusted to maintain realistic spatial audio rendition and accurate audio pickup.

Properly positioning the remote device 102, relative to the head worn device, can allow the camera 114 to capture the image of the audio device 104 being worn on the head 106 of the user 108 at an angle that provides information about the relative position between the audio device 104 and the user anatomy. At times, however, it may be difficult for the user 108 to determine from the display 211 of the remote device 102 (which may display the image being captured by the camera 114) whether the remote device 102 is properly positioned. More particularly, since the remote device 102 may be scanning a side of the head 106, the user 108 may not be able to see the display 211 of the remote device 102, and thus, may not be able to rely on the display 211 for guidance in positioning the remote device 102.

Referring to FIG. 7, a flowchart of a method of guiding a user to capture an image of an audio device worn on a head of the user is shown in accordance with an aspect. At operation 702, the camera 114 of the remote device 102 can capture the image of the audio device 104 worn on the head 106 of the user 108. In an aspect, feedback can be provided to the user 108 by a secondary device to guide the user 108 in moving the remote device 102 to the proper position for image capture. More particularly, at operation 704, the secondary device can output one or more of a visual cue, an audio cue, or a haptic cue to guide the user 108 to move the remote device 102 relative to the audio device 104. The secondary device can be a monitoring device 602 (FIG. 6), which is a device other than the remote device 102, and can output the cues to the user 108. The cues can induce the user 108 to move the remote device 102 to the proper position for image capture.

The monitoring device 602 can be a phone, a computer, or another device having a visual display, speakers, haptic motors, or any other components capable of providing guidance cues to the user 108 to help the user 108 properly position the camera 114 of the remote device 102. The monitoring device 602 can visually display, audibly describe, tactilely stimulate, or otherwise feed information back to the user 108 about the progress of the scan or about the position of the remote device 102 relative to the audio device 104. The feedback provides for a more efficient and accurate imaging operation to the enrollment process.

In an aspect, the monitoring device 602 is a wearable device. More particularly, the user 108 can wear the monitoring device 602 while performing the enrollment process that includes the imaging operation. The wearable device may be a device other than the remote device 102. For example, the monitoring device 602 may be the audio device 104, e.g., the wearable device 110 or the earphones 112, that are worn on the head 106 of the user 108. The ability to wear the monitoring device 602 ensures that the device is present and easily viewable whenever the user 108 wants to perform acoustic adjustment based on a fit of the audio device 104.

The wearable device may be a device other than the remote device 102 and the audio device 104. For example, the monitoring device 602 may be a smartwatch that is worn on a wrist of the user 108. The smartwatch can have a computer architecture similar to remote device 102. The smartwatch can include a display for presenting visual cues, a speaker to present audio cues, or a vibration motor or other actuators to provide haptic cues. When the smartwatch is worn on the wrist, it can be easily positioned in the field of view of the user 108 while the remote device 102 is held at a position outside of the field of view of the user 108. The remote device 102 can stream images or other position information, e.g., inertial measurement unit (IMU) data, to the monitoring device 602. The monitoring device 602 may use the position information to determine and present guidance instructions to the user 108 in visual, audio, or haptic form. Accordingly, the monitoring device 602 can be a third device in the audio system 100, in addition to the remote device 102 and the audio device 104, to allow the user 108 to enroll and determine an audio filter that can compensate for a separation between the electroacoustic transducer 208 and the anatomical feature.

In an aspect, the monitoring device 602 provides a visual cue to guide the user 108. The remote device 102 can stream images captured by the camera 114 to the audio device 104 for presentation on the display 211. For example, the user 108 can be viewing an image of a side of his head 106 on the audio device display 211. The image can be provided by the remote device 102 that he is holding with his arm straightened and extended to his side. The user 108 can move the remote device 102 based on the streamed image until the remote device 102 is at a desired position. In addition to the image(s) of the audio device 104 worn on the head 106 of the user 108, the audio device 104 may also display textual instructions, icons, indicators, or other information that directs the user 108 to move the remote device 102 in a particular manner. For example, the monitoring device 602 can determine, based on the image(s) or positional information provided by the remote device 102, the current position and orientation of the remote device 102. Blinking arrows can be displayed to indicate a direction that the remote device 102 should be moved to optimally capture the relative position between the audio device 104 and the user anatomy. For example, the arrows can guide the user 108 to move the remote device 102 from the current position to the optimal position. Accordingly, the monitoring device 602 provide cues to guide the user 108 to position the phone at a particular location, in a particular orientation (pitch, yaw, and roll) relative to a gravitational vector or the audio device 104, or at a particular distance from the audio device 104.

In an aspect, the monitoring device 602 provides an audio cue to guide the user 108. For example, the speaker 210 of the wearable device, e.g., the smartwatch or the audio device 104, can provide a descriptive version of the visual cues described above. More particularly, audio instructions such as "tilt your head to the left," "rotate your head," "move your phone to the left," "tilt your phone away from you," or other instructions can be provided to guide the user 108 to properly position the remote device 102 relative to the audio device 104. The instructions need not be spoken. For example, a tone may be output periodically in the manner of a radar bleep. A frequency of the bleeping can increase as the remote device 102 nears the optimal position. Accordingly, when the user 108 has moved the remote device 102 with the intent to reach the optimal position based on the feedback of increasing frequency of the bleeping, the remote device 102 will become properly positioned. When properly positioned, the remote device 102 can capture the image that represents the relative position between the audio device 104 and the anatomical feature.

In an aspect, the monitoring device 602 provides a haptic cue to guide the user 108. For example, a vibration motor or other actuator of the wearable device, e.g., the smartwatch or the audio device 104, can provide tactile feedback, such as a vibration, in a manner similar to the audio cues described above. More particularly, a vibration pulse may be output periodically in the manner of a radar bleep. A frequency of the pulses can increase as the remote device 102 nears the optimal position. Accordingly, when the user 108 has moved the remote device 102 with the intent to reach the optimal position based on the feedback of increasing frequency of the pulses, the remote device 102 will become properly positioned. When properly positioned, the remote device 102 can capture the image that represents the relative position between the audio device 104 and the anatomical feature.

Figure 8:
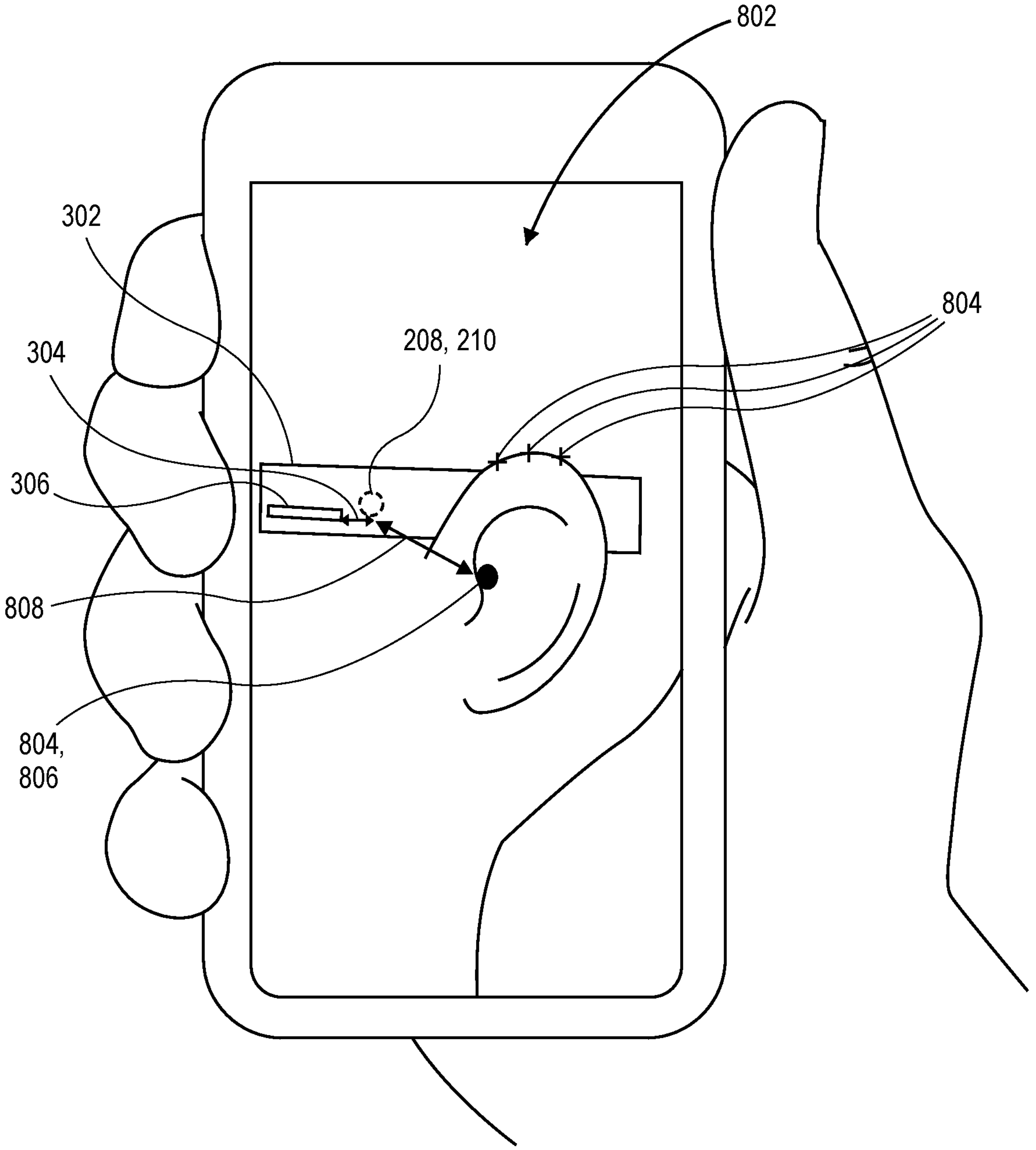
FIG. 8 is a pictorial view of an image of an audio device worn on a head of a user, in accordance with an aspect.

Referring to FIG. 8, a pictorial view of an image of an audio device worn on a head of a user is shown in accordance with an aspect. At operation 504 (FIG. 5), a relative position 808 between the anatomical feature 804 and the electroacoustic transducer 208 is determined based on the image 802. An image 802 is shown on the display 211 of the remote device 102 while the user 108 is holding the remote device 102 near the optimal position described above. It will be appreciated that the image 802 is shown on the display 211 for illustration purposes, but the image 802 may be received as an image file representing the view shown. Accordingly, the image 802 may be processed to identify certain image features. For example, the image 802 can include the datum 306 of the audio device 104 and one or more anatomical features 804 of the user 108. The datum 306 can be a marking on the temple 302 of the wearable device 110, as described above. The datum can also be a feature, such as an edge, a structure, or any feature of the audio device 104 that is identifiable in the image 802. The anatomical feature 804 can be an ear canal entrance 806 or an upper edge of a pinna of the user 108, as shown. The anatomical feature 804 can also be the mouth 120 of the user 108, an ear lobe of the user 108, or any other anatomical feature identifiable in the image 802.

In an aspect, the image 802 does not include the electroacoustic transducer 208. More particularly, the electroacoustic transducer 208 may be hidden in the image 802. For example, the electroacoustic transducer 208 may be the speaker 210 mounted on an inner surface of the temple 302 that is hidden behind the temple 302. Accordingly, a relative position 808 between the anatomical feature 804 and the electroacoustic transducer 208 may not be directly identifiable from the image 802.

To determine the relative position 808, the geometric relationship 304 between the identifiable datum 306 and the electroacoustic transducer 208 may be used. More particularly, the geometry of the audio device 104 may be known and stored, e.g., as the CAD model of the audio device 104. The geometry can therefore be used to relate any identifiable point on the audio device 104 to another point on the audio device 104, whether the other point is visible in the image 802 or not. In an aspect, when the electroacoustic transducer 208 is hidden from view, the location of the datum 306 can be identified and then related to the electroacoustic transducer 208. More particularly, the geometric relationship 304 based on the CAD model can be used to mathematically determine the unknown location of the electroacoustic transducer 208 based on the known location of the datum 306.

When the location of the electroacoustic transducer 208 is known, it can be used to determine the relative position 808 between the electroacoustic transducer 208 and the anatomical feature 804. For example, the relative position 808 between the speaker 210 and the ear canal entrance 806 can be determined from the image 802 of FIG. 8, based on the known geometric relationship 304. Alternatively, the relative position between a microphone and the mouth of the user 108 can be determined when the image 802 includes the earphone body 402 positioned relative to the mouth 120. Thus, the relative position 808 between the anatomical feature 804 and the electroacoustic transducer 208 of the audio device 104 can be determined based on the image 802 and the geometric relationship 304 between the datum 306 and the electroacoustic transducer 208.

At operation 506 (FIG. 5), an audio filter is determined based on the relative position 808. By determining the relative position and/or orientation of the electroacoustic transducer 208 to the anatomical feature 804, a personalized audio filter, e.g., a personalized equalizer, can be generated or selected to compensate for the separation. The relative position 808 may be used to reference a look-up table, for example, or to otherwise identify an audio filter stored in the memory 204 that corresponds to the separation between the electroacoustic transducer 208 and the anatomical feature 804.

In the case of audio output, the audio filter can be used in combination with an HRTF to not only take anatomy into account, but also to take how the audio device 104 fits on the user 108 into account when providing spatial audio. In the case of audio input, the audio filter can be used to filter inputs based on how the orientation of the audio device 104, e.g., the body 402 of the earphone 112, locates and directs the microphone 212 relative to the sound source, e.g., the mouth 120. Accordingly, as described below, the determined audio filter can be used for audio playback, to adjust how the speaker 210 outputs sound, or the determined audio filter can be used for audio pickup, to adjust how the microphone 212 picks up sound. In either case, the audio filter can compensate for artifacts that the relative position 808 introduces.

Figure 9:
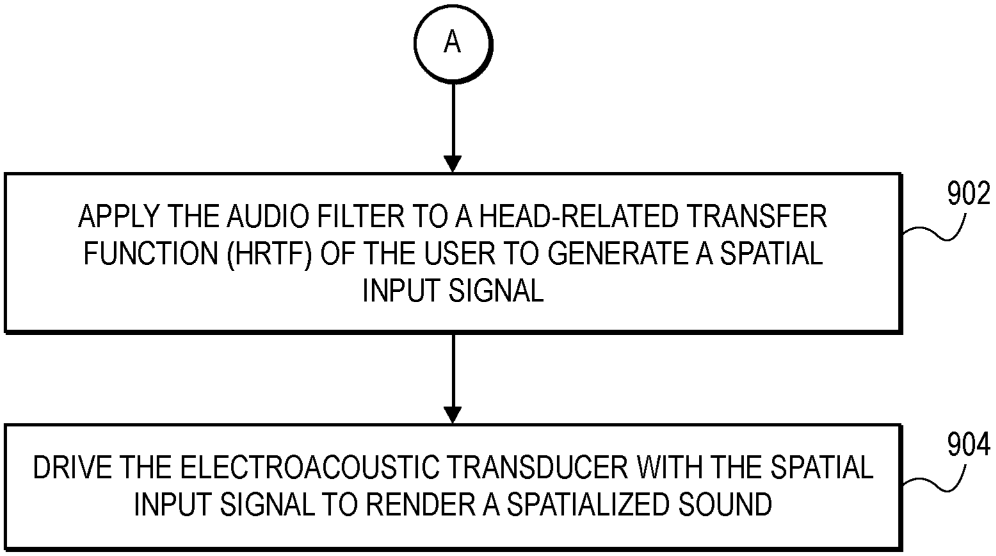
FIG. 9 is a flowchart of a method of using an audio filter for audio playback, in accordance with an aspect.

Referring to FIG. 9, a flowchart of a method of using an audio filter for audio playback is shown in accordance with an aspect. The operations of the method are illustrated in FIG. 10, and thus, the operations are described in reference to that figure below.

Figure 10:
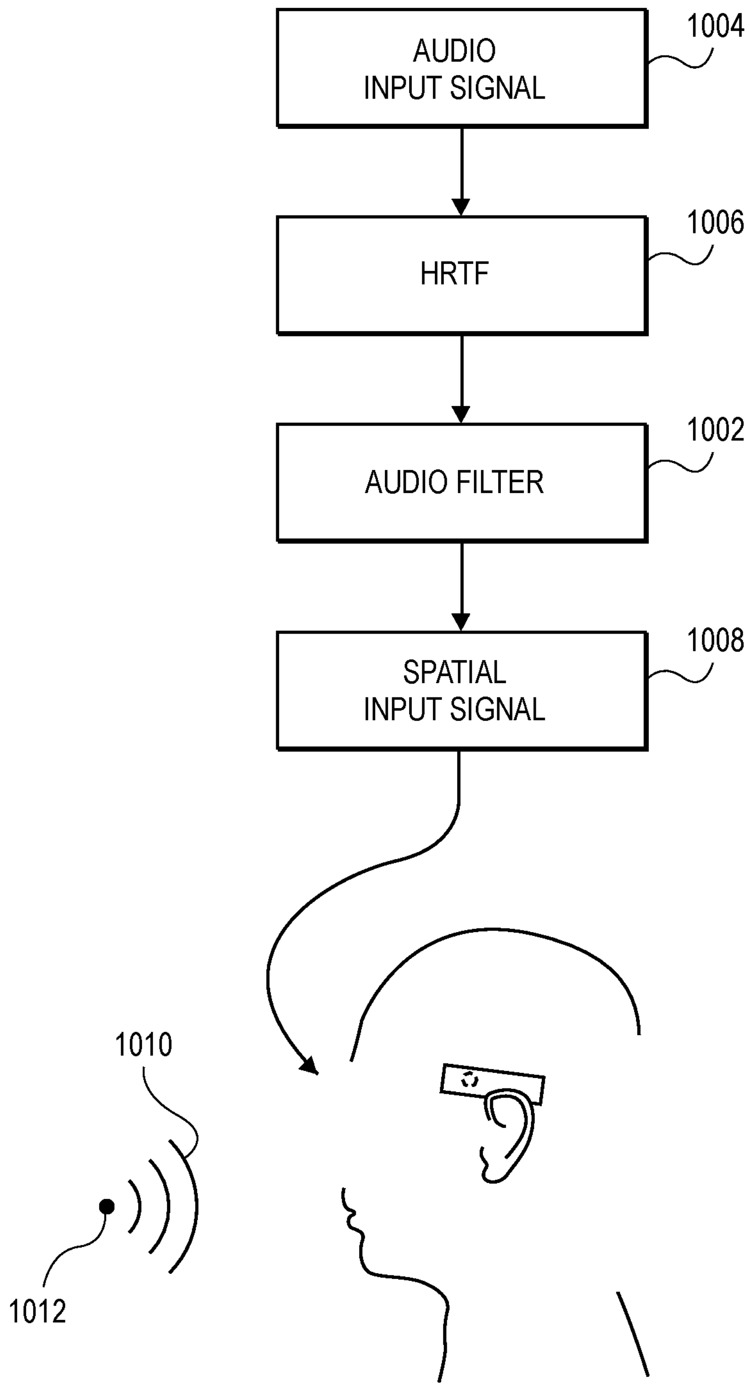
FIG. 10 is a pictorial view of a method of using an audio filter for audio playback of a spatialized sound, in accordance with an aspect.

Referring to FIG. 10, a pictorial view of a method of using an audio filter for audio playback of a spatialized sound is shown in accordance with an aspect. At operation 902, the audio filter 1002 is applied to an audio input signal 1004 to generate a spatial input signal 1008. The audio input signal 1004 can be audio data provided by the one or more audio sources 206 of the remote device 102. The audio filter 1002 can be applied directly or indirectly to the audio input signal 1004. For example, the audio filter 1002 may be applied to the audio input signal 1004 before or after it is modified by an HRTF 1006. In an aspect, the HRTF 1006 is applied to the audio input signal 1004 to modify the audio input signal 1004 such that it is spatialized based on a particular anatomy of the user 108. The particular anatomy of a region of interest, such as a pinna of the user, can have a substantial effect on how sound reflects or diffracts around a listener's head before entering their auditory system, and the HRTF 1006 can be applied to the audio input signal 1004 to shape the signal in such a way that reproductions of the shaped signal realistically simulates a sound traveling to the user from a surrounding environment. As described above, the HRTF 1006 can be selected as part of an enrollment process. The audio filter 1002 may then be applied to the modified signal to not only account for the anatomy, but to also adjust the HRTF 1006 based on the location of the speaker 210 relative to the ear canal entrance 806.

The result of modifying the audio input signal 1004 with both the HRTF 1006 and the audio filter 1002 is a spatial input signal 1008. The spatial input signal 1008 is the audio input signal 1004 filtered by the HRTF 1006 and the audio filter 1002 such that an input sound recording is changed to simulate the diffraction and reflection properties of an anatomy of the user 108, and to compensate for the artifacts introduced by separating the speaker 210 from the ear canal entrance 806. Spatial input signal 1008 can be communicated by the processor(s) 202 to the speakers 210. At operation 904, the speaker 210 is driven with the spatial input signal 1008 to render a spatialized sound 1010 to the user 108. The spatialized sound 1010 can simulate a sound, e.g., a voice, generated by a spatialized sound source 1012, e.g., a speaking person, in a virtual environment surrounding the user 108. More particularly, by driving the speakers 210 with the spatial input signal 1008, spatialized sound 1010 can be rendered accurately and transparently to the user 108.

In addition to improving sound spatialization, the personalized equalization of playback using the audio filter 1002 can improve consistency of playback from user to user. The personalized equalization may make sound entering the ear canal constant for all users. More particularly, the sound color for stereo playback can be perceived the same across a population of users. Such consistency can be advantageous in homogenizing the user experience.

Figure 11:
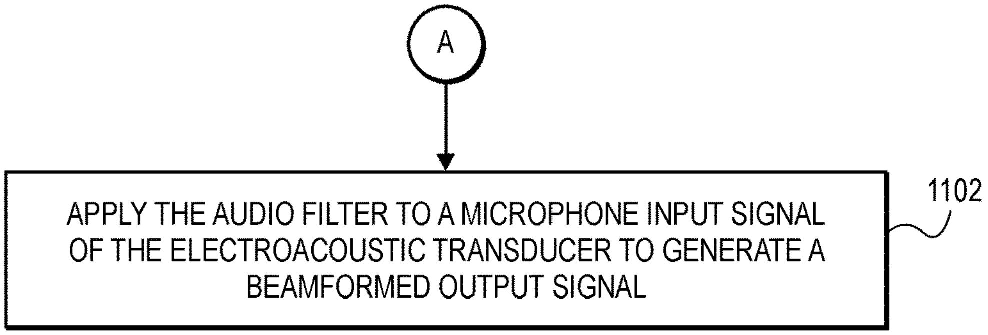
FIG. 11 is a flowchart of a method of using an audio filter for audio pickup, in accordance with an aspect.

Referring to FIG. 11, a flowchart of a method of using an audio filter for audio pickup is shown in accordance with an aspect. The operations of the method are illustrated in FIG. 12, and thus, the operations are described in reference to that figure below.

Figure 12:
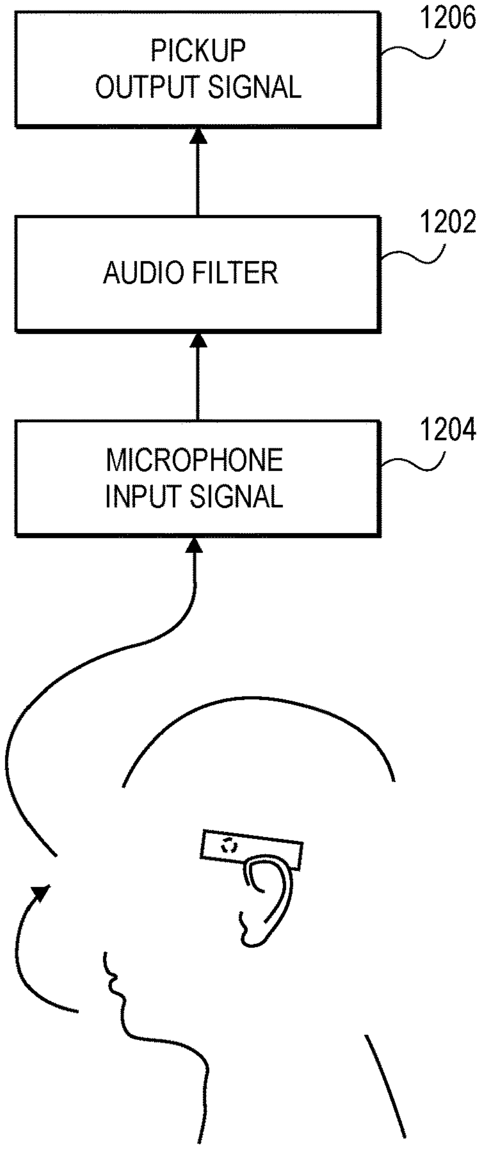
FIG. 12 is a pictorial view of a method of using an audio filter for audio pickup, in accordance with an aspect

Referring to FIG. 12, a pictorial view of a method of using an audio filter for audio pickup is shown in accordance with an aspect. As described above, the determined audio filter 1002 can be used for audio pickup. At operation 1102, the audio filter 1202 is applied to a microphone input signal 1204 of the microphone 212. For example, the microphone 212 can generate the microphone input signal 1204 based on incident sound waves, and the audio filter 1202 can be applied to the microphone input signal 1204 to generate a pickup output signal 1206. As a result, the audio filter 1202 can adjust the microphone input signal 1204 based on the relative position 808 between the microphone 212 and the mouth 120 of the user 108 (or another sound source). The adjustment can result in a more accurate pickup output signal 1204. For example, the audio filter 1202 can be derived to improve voice pickup, transparency, active noise control, or other microphone pickup functionality.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

In the foregoing specification, the invention has been described with reference to specific exemplary aspects thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method, comprising:

receiving, by one or more processors, an image of an audio device, wherein the image includes a datum of the audio device and an anatomical feature of a user of the audio device;

determining, by the one or more processors, a relative position between the anatomical feature and an electroacoustic transducer of the audio device based on the image and a geometric relationship between the datum and the electroacoustic transducer; and determining, by the one or more processors, an audio filter based on the relative position.

2. The method of claim 1, wherein the image does not include the electroacoustic transducer.

3. The method of claim 1, wherein the geometric relationship is based on a computer-aided design model of the audio device.

4. The method of claim 1, wherein the electroacoustic transducer is a speaker, and wherein the anatomical feature is an ear canal entrance of the user.

5. The method of claim 4 further comprising:

applying, by the one or more processors, the audio filter to an audio input signal to generate a spatial input signal; and driving, by the one or more processors, the speaker with the spatial input signal to render a spatialized sound.

6. The method of claim 1, wherein the electroacoustic transducer is a microphone, and wherein the anatomical feature is a mouth of the user.

7. The method of claim 6 further comprising:

applying, by the one or more processors, the audio filter to a microphone input signal of the microphone.

8. The method of claim 1 further comprising:

capturing, by a camera of a remote device, the image of the audio device; and outputting, by a monitoring device, one or more of a visual cue, an audio cue, or a haptic cue to guide the user to move the remote device relative to the audio device.

9. The method of claim 8, wherein the monitoring device is a wearable device.

10. The method of claim 9, wherein the wearable device is the audio device.

11. An audio system, comprising:

a memory configured to store an image of an audio device, wherein the image includes a datum of the audio device and an anatomical feature of a user of the audio device; and one or more processors configured to:

determine a relative position between the anatomical feature and an electroacoustic transducer of the audio device based on the image and a geometric relationship between the datum and the electroacoustic transducer; and determine an audio filter based on the relative position.

12. The audio system of claim 11, wherein the image does not include the electroacoustic transducer.

13. The audio system of claim 11, wherein the electroacoustic transducer is a speaker, and wherein the anatomical feature is an ear canal entrance of the user.

14. The audio system of claim 13, wherein the one or more processors are configured to:

apply the audio filter to an audio input signal to generate a spatial input signal; and drive the speaker with the spatial input signal to render a spatialized sound.

15. The audio system of claim 11, wherein the electroacoustic transducer is a microphone, and wherein the anatomical feature is a mouth of the user.

16. A non-transitory machine readable medium storing instructions executable by one or more processors of an audio system to cause the audio system to perform a method comprising:

receiving an image of an audio device, wherein the image includes a datum of the audio device and an anatomical feature of a user of the audio device;

determining a relative position between the anatomical feature and an electroacoustic transducer of the audio device based on the image and a geometric relationship between the datum and the electroacoustic transducer; and determining an audio filter based on the relative position.

17. The non-transitory machine readable medium of claim 16, wherein the image does not include the electroacoustic transducer.

18. The non-transitory machine readable medium of claim 16, wherein the electroacoustic transducer is a speaker, and wherein the anatomical feature is an ear canal entrance of the user.

19. The non-transitory machine readable medium of claim 18, wherein the method comprises:

applying the audio filter to an audio input signal to generate a spatial input signal; and driving the speaker with the spatial input signal to render a spatialized sound.

20. The non-transitory machine readable medium of claim 16, wherein the electroacoustic transducer is a microphone, and wherein the anatomical feature is a mouth of the user.

* * * * *